Feb. 8, 1955 H. BERGERHOFF 2,701,507
APPARATUS FOR CONVEYING FILMS IN CAMERAS
Filed Jan. 27, 1951

INVENTOR
Hugo Bergerhoff
BY A. John Michel
ATTORNEY

United States Patent Office 2,701,507
Patented Feb. 8, 1955

2,701,507

APPARATUS FOR CONVEYING FILMS IN CAMERAS

Hugo Bergerhoff, Frankfurt am Main, Germany

Application January 27, 1951, Serial No. 208,145

6 Claims. (Cl. 95—31)

The present invention relates to a mechanism for feeding a reel of film in a photographic camera.

It is the principal object of this invention to provide a film reel actuating device requiring only a relatively small space and assuring accurate guidance and feeding and correct positioning of the film by a single manipulation.

In accordance with the invention, a photographic camera of the roll holding type comprising a camera case and a supply spool is provided with a film feeding device comprising a finite length of a flexible push-and-pull element, a guide channel in the camera case, a ratchet wheel secured to said supply spool and surrounded by said guide channel, a pawl secured to the push-and-pull element, and actuating means secured to the element and adapted to reciprocate it in the channel, the pawl gliding over the ratchet wheel during the pushing movement of the push-and-pull element and engaging the ratchet wheel during its pulling movement. The push-and-pull element may be a link chain and said actuating means may be provided with a retracting spring exerting a pulling force on the element.

Figure 1:
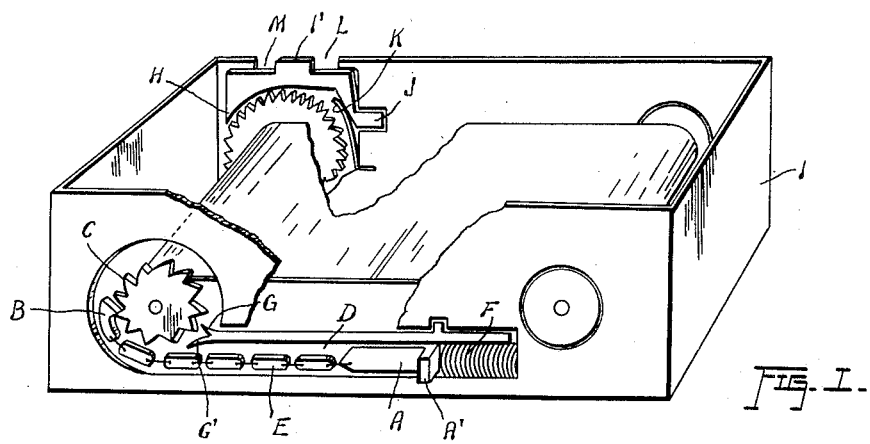
Figure 2:
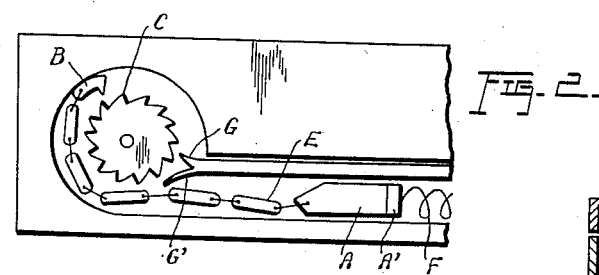
Figure 3:
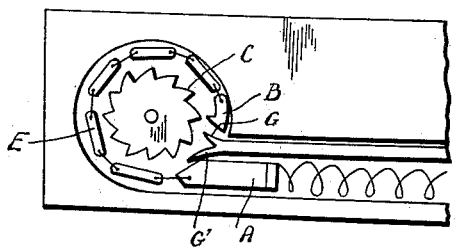
Figure 4:
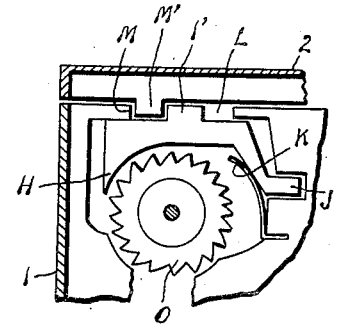
Figure 5:
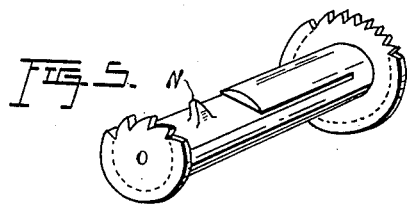

A film feeding apparatus according to the present invention is illustrated by the accompanying drawing, and there is shown in:

Fig. 1 a perspective view of the film feeding device with the push-and-pull element in an intermediate pushing position;

Fig. 2 a side view of a portion of a film feeding device according to Fig. 1 with the push-and-pull element in pushing position;

Fig. 3 a side view of a portion of the film feeding device according to Fig. 1 with the push-and-pull element in resting position;

Fig. 4 a view of a portion of the camera showing the supply spool region with the device for checking the reverse movement;

Fig. 5 a special design of a supply spool.

The film feeding device according to Figs. 7–3 comprises a sliding block A reciprocable in channel D of casing 1. Block A is provided with actuating handle A'. The sliding block is connected at one end to retracting spring F and at the other end to link chain E. Attached to the free end of the link chain is a hook-shaped pawl B cooperating with the toothed ratchet wheel C rigidly mounted on the supply spool. The pawl B and the teeth of the ratchet wheel C are shaped in such a way that the pawl, when in the pushing position (Fig. 2), simply slides over the teeth of the wheel without being able to actuate them, so that the pawl may be pushed by means of the block A to its final or resting position (Fig. 3) in cooperation with the link chain. Here a deflector G keeps the pawl from engaging the teeth of the ratchet wheel so that, at this stage of operations, it is always possible to reel the film back on the spool. When, however, for the purpose of feeding the film the block A is moved to the right from the resting position the hook of the pawl slides off the deflector in the direction of the teeth of the ratchet wheel and is forced into engagement with the teeth of the wheel. By the progressing movement of the block A the spool is rotated and the film fed a corresponding distance, until the pawl B gets in contact with another deflector G' which lifts it off the teeth of the ratchet wheel. In order to insure an efficient operation of link chain D, the length of the links of the chain may be made approximately the size of the radius of the smallest curvature of the wall guiding the chain, i. e. within the range of the ratchet wheel C.

For the purpose of checking any reverse rotation of the supply spool, the latter is, as is shown in Fig. 4, coupled with a ratchet wheel O acting only in one direction due to the action of the pawl H fastened to a slide I that is guided by the wall of the casing as well as an opening in a partition wall and controlled by the spring K. For rolling the film back on the supply spool, the slide I has to be moved toward the left, which is done by inserting a finger in the intermediate space L between a projection or lug l' on the slide I and the edge of an opening in the casing wall against the pressure of the spring K. In order to prevent any normal feeding during this reverse reeling there is provided on the other side of lug l' an intermediate space M into which a cam or the like is inserted when the cover 2 of the camera casing is closed. This lug M' can be inserted, i. e. the cover can only be closed if lug l' forms the intermediate space M, i. e. when the supply spool is checked against reverse rotation.

The spool itself is shown in Fig. 5 and contains for the purpose of simplification of the fastening of the leading end of the film a slot that is open only on one side, and a nose N located near the opening of the slot on which a perforation of the film can be slipped. On the side from where the film is put on the spool the nose is sloped in order to facilitate the passage of a portion of the film over the nose and of the remaining portion through the slot until it arrives at the desired position where the end of the film is to be shoved on the spool; when in this position a pull is exerted on the film an opening of the lateral perforation of the film slips on the nose which on its other side has a radial surface so that the film is secured in its position.

According to the invention the different elements are positioned in recesses or the like in the casing of the camera without the use of screws, rivets, or special bearings, so that not only the production but also the assembling is very much simplified and can be carried out in the shortest possible time.

The above described characteristics of the present invention, especially the feeding of the film by means of a link chain, as well as the design of the spool may be used in any kind of camera without being dependent on the here described design of the device for checking the reversing of the spool. The movement of block A can, if desired, be used for the setting of the camera-shutter.

What I claim is:

1. In a photographic film camera comprising a camera case and a supply spool: a film feeding device comprising a finite length of a flexible push and pull element, a guide channel in the camera case, said push and pull element being reciprocably guided in said channel, a toothed ratchet wheel secured to said supply spool and surrounded by said guide channel, a hook-like pawl secured to said push and pull element, and actuating means secured to said element for reciprocating it in said channel, said pawl gliding over said ratchet wheel during the pushing movement of the push and pull element and engaging the ratchet wheel during its pulling movement.

2. Film feeding device as defined in claim 1, wherein said flexible push and pull element consists of a link chain of predetermined length.

3. Film feeding device as defined in claim 1, wherein said actuating means is a sliding block arranged and guided in said channel, a spring element being arranged to exert pressure on said sliding block in one direction.

4. Film feeding device as defined in claim 1, comprising deflection means arranged at one end of said guide channel for disengaging the pawl from the ratchet wheel.

5. Film feeding device as defined in claim 1, comprising a second ratchet wheel coupled to the end of the supply spool opposite the first-named ratchet wheel, a sliding stop member arranged in an opening in the camera casing for engaging the second ratchet wheel and stop reverse reeling, and spring means arranged to hold the sliding stop member under pressure in engagement with the second ratchet wheel.

6. Film feeding device as defined in claim 5, comprising a cover plate having a cam adapted to engage a space formed between the sliding stop member and the camera casing when the stop member engages the second ratchet wheel.

References Cited in the file of this patent

UNITED STATES PATENTS

| | | |
|---|---|---|
| 1,062,313 | Whitman | May 20, 1913 |
| 1,144,934 | Cutler | June 29, 1915 |
| 1,375,324 | Sayo | Apr. 19, 1921 |
| 1,395,869 | Pickard | Nov. 1, 1921 |
| 1,828,205 | Schmitt et al. | Oct. 20, 1931 |
| 1,934,178 | Field | Nov. 7, 1933 |
| 2,153,606 | Albert | Apr. 11, 1939 |